United States Patent
Wang et al.

(10) Patent No.: US 12,083,456 B2
(45) Date of Patent: Sep. 10, 2024

(54) APPARATUS AND METHOD FOR PURIFICATION AND RECOVERY OF ORGANIC LIQUID

(71) Applicant: TAIZHOU DASHU INFORMATION TECHNOLOGY CO., LTD., Taizhou (CN)

(72) Inventors: Junhua Wang, Zhejiang (CN); Zhiliang Xu, Zhejiang (CN); Mingyuan Hua, Zhejiang (CN); Zhenzhong Yan, Zhejiang (CN); Tianze Wang, Zhejiang (CN)

( * ) Notice: Subject to any disclaimer, the term of this patent is extended or adjusted under 35 U.S.C. 154(b) by 202 days.

(21) Appl. No.: 17/776,181

(22) PCT Filed: Dec. 1, 2020

(86) PCT No.: PCT/CN2020/133001
§ 371 (c)(1),
(2) Date: May 11, 2022

(87) PCT Pub. No.: WO2021/129322
PCT Pub. Date: Jul. 1, 2021

(65) Prior Publication Data
US 2022/0410030 A1   Dec. 29, 2022

(30) Foreign Application Priority Data

Dec. 26, 2019  (CN) .......................... 201911368513.7
Dec. 26, 2019  (CN) .......................... 201922389342.8

(51) Int. Cl.
*B01D 3/10*   (2006.01)
(52) U.S. Cl.
CPC ...................................... *B01D 3/10* (2013.01)

(58) Field of Classification Search
CPC .......... B01D 1/0082; B01D 3/02; B01D 3/10; B01D 3/42; B01D 5/009
See application file for complete search history.

(56) References Cited

U.S. PATENT DOCUMENTS 5,980,695 A * 11/1999 Cox .......................... B01D 3/10
                                                         202/205
6,159,345 A * 12/2000 Donnelly ................. B01D 3/10
                                                         202/205
(Continued)

FOREIGN PATENT DOCUMENTS

CN          201195058 Y       2/2009
CN          204034299 U      12/2014
(Continued)

OTHER PUBLICATIONS

CN 204034299 IPcom Machine Translation Obtained Jan. 23, 2024. (Year: 2024).*

*Primary Examiner* — Jonathan Miller

(57) ABSTRACT

An apparatus and method for purification and recovery of an organic liquid. The apparatus includes a distillation kettle and a receiver tank connected by a distillation pipe, and a vacuum pump, wherein a vacuum storage tank is arranged between the receiver tank and the vacuum pump; the vacuum storage tank is connected to the receiver tank by a vacuum regulating pipe, a first vacuum regulating valve being arranged on the vacuum regulating pipe; and the vacuum storage tank is connected to the vacuum pump by an evacuation pipe, a second vacuum regulating valve being arranged on the evacuation pipe. By arranging a vacuum storage tank between the receiver tank and the vacuum pump, the vacuum degree in the receiver tank is regulated by the vacuum storage tank, such that the organic liquid is recovered in a sealed environment under reduced pressure.

13 Claims, 1 Drawing Sheet

(56) References Cited

U.S. PATENT DOCUMENTS

| | | | | |
|---|---|---|---|---|
| 6,352,618 | B1* | 3/2002 | Mabry | B01D 3/42 |
| | | | | 203/68 |
| 7,288,169 | B2* | 10/2007 | Yada | C07C 51/44 |
| | | | | 202/205 |
| 7,998,317 | B2 | 8/2011 | Chang | |
| 2004/0222077 | A1* | 11/2004 | Yada | C07C 51/44 |
| | | | | 202/205 |
| 2019/0016989 | A1* | 1/2019 | Steele | B01D 11/0296 |

FOREIGN PATENT DOCUMENTS

| | | |
|---|---|---|
| CN | 206138769 U | 5/2017 |
| CN | 206518903 U | 9/2017 |
| CN | 210138473 U | 3/2020 |
| CN | 111659148 A | 9/2020 |
| CN | 211676369 U | 10/2020 |

\* cited by examiner

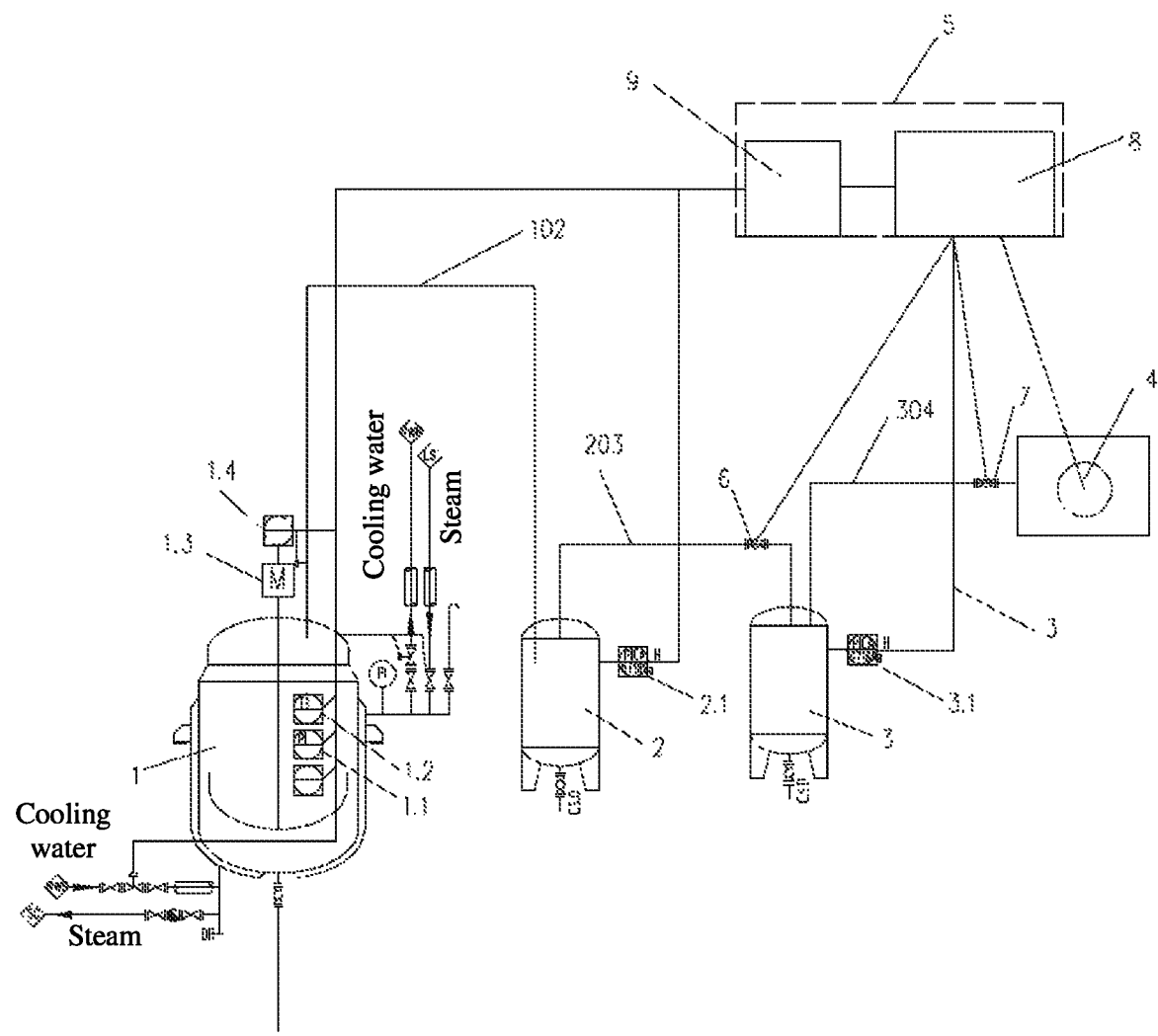

APPARATUS AND METHOD FOR PURIFICATION AND RECOVERY OF ORGANIC LIQUID

CROSS-REFERENCE TO RELATED APPLICATIONS

This application is a continuation of International Application No. PCT/CN2020/133001, filed on Dec. 1, 2020, which claims the benefit of priority from Chinese Patent Application No. 201922389342.8 and Chinese Patent Application No. 201911368513.7, filed on Dec. 26, 2019. The content of the aforementioned applications, including any intervening amendments thereto, is incorporated herein by reference.

TECHNICAL FIELD

The present invention relates to an apparatus and method for purification and recovery of an organic liquid, and can be applied in the fields of organic chemical industry and medical and chemical industry.

BACKGROUND

At present, three wastes (i.e., exhaust gas, waste water and industrial slag) have caused serious environmental pollution in the organic chemical industry and the medical and chemical industry, and in particular in the recovery of organic solvents where the employment of vacuum leads to a high volatility of the solvents, and hence the volatilization of organic solvents inevitably results in environmental pollution. Many engineers are committed to solving this problem. The currently frequently used methods include: method A, absorption of tail gas with activated carbon and activated fiber; method B, treatment by means of cryogenic process or multi-stage cooling; and method C, neutralization of the tail gas before discharge thereof into a wastewater treatment system to be treated. With regard to method A, high-temperature desorption is required, operation steps are complicated, and the investment is high; the multi-stage cooling of method B has a limited effect, while the cryogenic process requires a large amount of liquid nitrogen, and hence it is not convenient for industrial production; method C is very limited in that the method cannot be used for tail gas that is insoluble in water, while once the tail gas is dissolved in water, wastewater is generated, requiring a supporting biochemical treatment system. At present, the recovery rate of organic solvents is between 60-80%. The lower the boiling point, the greater the volatility, and the lower the recovery rate. For example, the recovery rate of chloroform and ethyl acetate is generally about 70%, which means that 30% of the solvent is discharged into the atmosphere as unorganized exhaust gas and cannot be recovered, which is not only a waste of resources but pollutes the environment. According to statistics, the annual emission of organic exhaust gas is of an order of magnitude of about 10 million tons. Therefore, there is an urgent need of a simple and feasible method that can improve the recovery rate of organic solvents, thus reducing the pollution of organic exhaust gas to the environment and realizing a green recovery of organic liquids.

SUMMARY

The technical problem to be solved by the present invention is to provide a safe, environmentally friendly and energy saving apparatus and method for purification and recovery of organic liquids with high recovery rate and less generation of exhaust gas.

To solve the above technical problem, the present invention first discloses an apparatus for purification and recovery of an organic liquid, comprising a distillation kettle and a receiver tank connected by a distillation pipe, and further comprising a vacuum pump, wherein vacuum storage tank is arranged between the receiver tank and the vacuum pump; the vacuum storage tank and the receiver tank are connected by a vacuum regulating pipe, a first vacuum regulating valve being arranged on the vacuum regulating pipe; and the vacuum storage tank and the vacuum pump are connected by an evacuation pipe, a second vacuum regulating valve being arranged on the evacuation pipe; and the distillation kettle is provided with a temperature monitoring device and a pressure monitoring device, and the receiver tank and the vacuum storage tank are each provided with a respective pressure monitoring device.

Further, the vacuum storage tank may be provided with a condensing device to improve the recovery rate, where internal condensation or external condensation among others may be adopted by the condensing device, an example of the internal condensation being an internal circulation coil, and an example of the external condensation being a jacket arranged on the outside of the vacuum storage tank.

Further, the temperature monitoring device, the pressure monitoring device, the first vacuum regulating valve, the second vacuum regulating valve and the vacuum pump are all connected to an intelligent controller through control circuits.

Further, a cooling device is arranged on the outside of the distillation kettle, and a cooling water pipe and a steam pipe of the cooling device are each provided with a respective automatic control valve connected to the intelligent controller through a control circuit.

Further, the intelligent controller comprises a vacuum regulating controller and a safety controller, where the first vacuum regulating valve, the second vacuum regulating valve and the pressure monitoring device of the vacuum storage tank are connected to the vacuum regulating controller; the temperature monitoring device and the pressure monitoring device of the distillation kettle, the pressure monitoring device of the receiver tank and the automatic control valves of the cooling device are connected to the safety controller through control circuits.

The present invention further discloses a method for purification and recovery of an organic liquid by using the aforementioned apparatus, including:

1) feeding a liquid to be processed into the distillation kettle;
2) disabling communication between the vacuum storage tank and the receiver tank, turning on the vacuum pump to evacuate the vacuum storage tank to a preset value and then turning off the vacuum pump, and disabling communication between the vacuum pump and the vacuum storage tank;
3) enabling the communication between the vacuum storage tank and the receiver tank, the organic liquid being distilled off and collected in the receiver tank;
4) repeating steps 2) and 3) in turn in an event of insufficient vacuum in the vacuum storage tank; and
5) repeating step 4) for a plurality of times until there is no more liquid distillate being produced.

During the process, the liquid to be processed may be heated to a preset temperature after being fed into the distillation kettle in step 1); and in step 3), the temperature inside the distillation kettle is stabilized at a preset value first and then the vacuum storage tank is slowly opened to evacuate the receiver tank for distillation.

Further, the process of purification and recovery is controlled by the intelligent controller, wherein the vacuum regulating controller of the intelligent controller monitors the pressure in the vacuum storage tank and controls the opening and closing of the first vacuum regulating valve and the second vacuum regulating valve and the on and off states of the vacuum pump; and the safety controller of the intelligent controller monitors the pressure in the receiver tank and the pressure and temperature in the distillation kettle, controls the on and off states of the cooling device and a stirring device of the distillation kettle, and sounds an alarm when necessary.

The process of the method for purification and recovery of organic liquids using the aforementioned apparatus herein may also be as follows:
1) enabling the communication between the receiver tank and the vacuum storage tank and communication between the vacuum storage tank and the vacuum pump, and turning on the vacuum pump to evacuate the system to a preset value and then turning off the vacuum pump and disabling the communication between the vacuum pump and the vacuum storage tank;
2) continuously feeding a liquid to be processed into the distillation kettle, the organic liquid being distilled off and collected in the receiver tank;
3) in an event of insufficient vacuum in the vacuum storage tank, disabling the communication between the vacuum storage tank and the receiver tank, enabling the communication between the vacuum storage tank and the vacuum pump, and turning on the vacuum pump to evacuate the vacuum storage tank to a preset value and then turning off the vacuum pump and disabling the communication between the vacuum storage tank and the vacuum pump, and then enabling the communication between the vacuum storage tank and the receiver tank to continue the distillation of the liquid; and
4) repeating step 3) for a plurality of times until there is no more liquid distillate being produced.

Further, the distillation kettle is preheated to a preset value before step 1); and the liquid to be processed is preheated to a preset value before being fed into the distillation kettle in step 2).

Further, the process of purification and recovery is controlled by the intelligent controller, wherein the vacuum regulating controller of the intelligent controller monitors the pressure in the vacuum storage tank and controls the opening and closing of the first vacuum regulating valve and the second vacuum re acing valve and the on and off states of the vacuum pump; and the safety controller of the intelligent controller monitors the pressure in the receiver tank and the pressure and temperature in the distillation kettle, controls the on and off states of the cooling device and the stirring device of the distillation kettle, and sounds an alarm when necessary.

A vacuum storage tank is arranged between the receiver tank and the vacuum pump herein, such that the vacuum degree of the receiver tank is regulated by the vacuum storage tank to realize the recovery of organic liquids (organic solvents) under a reduced pressure and in an environment that is isolated from the vacuum pump. The vacuum pump is turned on intermittently instead of working continuously so as to avoid a direct and continuous evacuation of the system by the vacuum pump, thereby preventing the organic liquids from being sucked out during a continuous evacuation, which will result in a waste of the organic liquids and environmental pollution. An intelligent controller is arranged herein for an intelligent control of the vacuum and safety of the entire system, thereby greatly improving the accuracy of the vacuum degree, keeping the entire process in a stable, safe and controllable range, and further improving the recovery rate of the organic liquids (solvents) in a simple process that is easy to achieve. A recovery rate of organic liquids (solvents) of 98-99.5% is generally reached with the apparatus herein for purification and recovery thereof, with almost no loss. It is estimated that 10 million tons of organic solvents can be prevented from being discharged into the atmosphere annually if the apparatus herein is fully promoted, which will not only save resources while generating no pollution, but save energy. It is a green apparatus of the present invention for reduction of exhaust-gas emission during the recovery of organic solvents. The invention is suitable for both batch feeding and continuous feeding, wherein batch feeding is generally adopted by small-scale production, and continuous feeding by large-scale production.

BRIEF DESCRIPTION OF DRAWINGS

The single figure is a schematic diagram of connections according to the present invention.

In the accompanying drawings: 1 denotes a distillation kettle; 1.1 denotes a vacuum pressure gauge; 1.2 denotes a thermometer; 1.3 denotes a stirring motor; 1.4 denotes a motor control switch; 102 denotes a distillation pipe; 2 denotes a receiver tank; 2.1 denotes a receiver-tank vacuum gauge; 203 denotes a vacuum regulating pipe; 3 denotes a storage tank; 3.1 denotes a storage-tank vacuum gauge; 304 denotes an evacuation pipe; 4 denotes a vacuum pump; 5 denotes an intelligent controller; 6 denotes a first vacuum regulating valve; 7 denotes a second vacuum regulating valve; 8 denotes a vacuum regulating controller; and 9 denotes a safety controller.

DETAILED DESCRIPTION

The content of the utility model is described hereinafter in more details in combination with the embodiments. The implementation of the present invention is not limited to the embodiments hereinafter, and any formal modifications or amendments to the present invention should fall within the protection scope of the present invention.

The apparatus of the present invention for purification and recovery of an organic liquid, as shown in Figure, comprises a distillation kettle 1, a receiver tank 2, a vacuum storage tank 3 and a vacuum pump 4, wherein the distillation kettle 1 and the receiver tank 2 are connected by a distillation pipe 102 which extends from the top of the distillation kettle 1 and accesses the top of the receiver tank 2; the receiver tank 2 and the vacuum storage tank 3 are connected by a vacuum regulating pipe 203 which extends from the top of the receiver tank 2 and accesses the vacuum storage tank 3; the vacuum storage tank 3 and the vacuum pump 4 are connected by an evacuation pipe 304 which extends from the top of the vacuum storage tank 3 and accesses the vacuum pump 4. A cooling device is arranged outside the distillation kettle 1, a vacuum pressure gauge 1.2 and a thermometer 1.2 are arranged inside the distillation kettle 1, and the distillation kettle 1 is further provided with a stirring device driven by a stirring motor 1.3, the stirring motor 1.3 being provided with a motor control switch 1.4. A first vacuum regulating valve 6 is arranged on the vacuum regulating pipe 203; a second vacuum regulating valve 7 is arranged on the evacuation pipe 304; and a receiver-tank vacuum gauge 2.1 and a storage-tank vacuum gauge 3.1 are respectively arranged on an upper side of the receiver tank 2 and an upper side of the vacuum storage tank 3. The vacuum storage tank 3 is provided with a condensing device which uses internal condensation or external condensation, such as an internal circulation coil, or a jacket arranged outside the vacuum storage tank 3.

The apparatus further includes an intelligent controller 5 which includes a safety controller 9 and a vacuum regulating controller 8, wherein the safety controller 9 and the vacuum regulating controller 8 may be two functional modules or two separate control components. Intelligent safety control, which can greatly improve the control accuracy and safety, is extremely important in the chemical industry, especially in the process of high-risk chemical reactions.

The vacuum pressure gauge 1.1, the thermometer 1.2, the automatic control switch of the cooling device, and the motor control switch 1.4 are all connected to the safety controller 9 through control circuits; the first vacuum regulating valve 6, the storage-tank pressure gauge 3.1, the second vacuum regulating valve 7, and the vacuum pump 4 are all connected to the vacuum regulating controller 8 through control circuits.

Embodiment I 200 kg of dichloromethane with a mass content of 90% was fed into the distillation kettle 1 and heated to 20° C. After closing the first vacuum regulating valve 6 and opening the second vacuum regulating valve 7, the vacuum pump 4 was turned on to evacuate the vacuum storage tank 3 to −0.095 MPa and then the second vacuum regulating valve 7 was closed and the vacuum pump 4 was turned off. After the temperature of the distillation kettle 1 stabilized at 20° C., the first vacuum regulating valve 6 was slowly opened until there was solvent being distilled off, which was collected in the receiver tank 2, the openness of the first vacuum regulating valve 6 being regulated according to the flow rate. In an event of insufficient vacuum, the first vacuum regulating valve 6 was closed, the second vacuum regulating valve 7 was opened and the vacuum pump 4 was turned on to make up the vacuum. After a full complement of vacuum, the second vacuum regulating valve 7 was closed and the vacuum pump 4 was turned off, and the first vacuum regulating valve 6 was opened for further distillation. In order to ensure a certain amount of the solvent distillate, a further complement of vacuum could be performed when there was an insufficient vacuum degree at a later stage during distillation, and moreover, the temperature inside the distillation kettle 1 could be adjusted appropriately as well during the same process. In the present embodiment, the temperature was up to 30° C. for distillation at a later stage until there was no more distillate flowing out. 178.2 kg of dichloromethane was recovered with a dichloromethane content of 99.5%, the recovery rate being 99%.

200 kg of dichloromethane with a mass content of 90% was subjected to vacuum distillation at room temperature with the existing vacuum distillation equipment and 120 kg of dichloromethane was obtained with a recovery rate of 66.7% and a dichloromethane content of 99%.

Embodiment II 200 kg of ethanol with a mass content of 95% was fed into the distillation kettle 1, and heated to 40° C. After closing the first vacuum regulating valve 6 and opening the second vacuum regulating valve 7, the vacuum pump 4 was turned on to evacuate the vacuum storage tank 3 to −0.095 MPa and then the second vacuum regulating valve 7 was closed and the vacuum pump 4 was turned off. When the temperature of the distillation kettle 1 stabilized at 40° C., the first vacuum regulating valve 6 was slowly opened until there was solvent being distilled off, which was collected in the receiver tank 2, the openness of the first vacuum regulating valve 6 being regulated according to the flow rate. In an event of insufficient vacuum, the first vacuum regulating valve 6 was closed, the second vacuum regulating valve 7 was opened and the vacuum pump 4 was turned on to make up the vacuum. After a full complement of vacuum, the second vacuum regulating valve 7 was closed and the vacuum pump 4 was turned off, and the first vacuum regulating valve 6 was opened for further distillation. Same as in embodiment I, the distillation temperature was adjusted at a later stage to 50° C. until there was no more distillate flowing out. 188.5 kg of ethanol was recovered with an ethanol content of 99.5%, the recovery rate being 99.2%.

200 kg of ethanol with a mass content of 95% was subjected to vacuum distillation with the existing vacuum distillation equipment, and 140 kg of ethanol was obtained with a recovery rate of 73.7%, and an ethanol content of 99%.

Embodiment III 200 kg of dimethylbenzene of a mass content of 95% was fed into the distillation kettle 1 and heated to 60° C. After closing the first vacuum regulating valve 6 and opening the second vacuum regulating valve 7, the vacuum pump 4 was turned on to evacuate the vacuum storage tank 3 to −0.095 MPa and then the second vacuum regulating valve 7 was closed and the vacuum pump 4 was turned off. When the temperature of the distillation kettle 1 stabilized at 60° C., the first vacuum regulating valve 6 was slowly opened until there was solvent being distilled off, the openness of the first vacuum regulating valve 6 being regulated according to the flow rate. In an event of insufficient vacuum, the first vacuum regulating valve 6 was closed, the second vacuum regulating valve 7 was opened and the vacuum pump 4 was turned on to make up the vacuum. After a full complement of vacuum, the second vacuum regulating valve 7 was closed and the vacuum pump 4 was turned off, and the first vacuum regulating valve 6 was opened for further distillation. Same as in embodiment I, the distillation temperature was adjusted at a later stage to 80° C. until there was no more distillate flowing out. 189 kg of dimethylbenzene was recovered with a dimethylbenzene content of 99.5%, the recovery rate being 99.5%.

200 kg of dimethylbenzene with a mass content of 95% was subjected to vacuum distillation with the existing vacuum distillation equipment, and 170 kg of ethanol was obtained with a recovery rate of 89.5% and a dimethylbenzene content of 99%.

Embodiment IV 1000 kg of ethyl acetate with a mass content of 95% was preheated to 45° C. first by a heating kettle or other heating devices. The distillation kettle 1 was also preheated to 45° C. The first vacuum regulating valve 6 and the second vacuum regulating valve 7 were opened and the vacuum pump 4 was turned on to evacuate the system to −0.096 MPa, and then the second regulating valve 7 was closed and the vacuum pump 4 was turned off. Ethyl acetate started to be fed continuously (The feed and the amount of solvent distillate remained substantially the same.) into the distillation kettle 1. In an event of insufficient vacuum, the first vacuum regulating valve 6 was closed, the second vacuum regulating valve 7 was opened, and the vacuum pump 4 was turned on to evacuate the vacuum storage tank 3 to −0.096 MPa. Following a full complement of vacuum, the second regulating valve 7 was closed and the vacuum pump 4 was turned off, and the first vacuum regulating valve 6 was opened for further distillation till there was no distillate. 946 kg of ethyl acetate was recovered with an ethyl acetate content of 99.5%, the recovery rate being 99.5%.

200 kg of ethyl acetate with a mass content of 95% was subjected to vacuum distillation with the existing vacuum distillation equipment and 130 kg of ethyl acetate was obtained with a recovery rate of 68.4% and an ethyl acetate content of 99%.

Embodiment V. Solvent Recovery from Exhaust Gas of Gasoline

The first vacuum regulating valve 6 and the second vacuum regulating valve 7 were opened and the vacuum pump 4 was turned on to evacuate the distillation kettle system to −0.096 MPa, and then the second vacuum regulating valve 7 was closed and the vacuum pump 4 was turned off. 10 m³ of exhaust gas of gasoline with a mass content of gasoline of 0.1% started to be fed continuously and slowly into the distillation kettle 1, and a small amount of gasoline was slowly distilled off. In an event of insufficient vacuum, the first vacuum regulating valve 6 was closed, the second vacuum regulating valve 7 was opened, and the vacuum pump 4 was turned on to evacuate the vacuum storage tank 3 to −0.096 MPa. Following a full complement of vacuum, the second regulating valve 7 was closed and the vacuum pump 4 was turned off, and the first vacuum regulating valve 6 was opened for further distillation till there was no distillate. 7 kg of exhaust gas of gasoline was recovered with a gasoline content of 99%, the recovery rate being 97.2%.

Gasoline is not recoverable from exhaust gas of gasoline with a mass concentration of 0.1% with the existing vacuum distillation equipment.

Batch feeding was adopted in the above embodiments I to III, while continuous feeding was adopted in embodiments IV to V. And during the distillation in embodiments I to V, the opening and closing of the first vacuum regulating valve 6 and the second vacuum regulating valve 7, and the on and off states of the vacuum pump 4 can all be controlled by either manual operation or the intelligent controller 5, the latter having a better control accuracy than the former.

The Latter Control is as Follows:

the safety controller 9 monitors the vacuum degree in the distillation tank 1 and the receiver tank 2 at any time, and transmits signals to the vacuum regulating controller 8, such that the vacuum regulating controller 8 regulates the openness of the first vacuum regulating valve 6 based on the required vacuum degree of the system, thereby regulating the vacuum degree in the receiver tank 2 and the distillation tank 1 to form vacuum distillation suitable for the corresponding solvent. When it is detected by the vacuum regulating controller 8 that the vacuum degree in the vacuum storage tank 3 is insufficient and hence a complement of vacuum is required, as controlled by the vacuum regulating controller 8, the first vacuum regulating valve 6 will be closed, the second vacuum regulating valve 7 will be opened, and the vacuum pump 4 will be turned on to evacuate the vacuum storage tank 3. When it is detected by the vacuum regulating controller 8 that the vacuum degree in the vacuum storage tank 3 has reached a preset value (−0.95-0.98 MPa), as controlled by the vacuum regulating controller 8, the second vacuum regulating valve 7 will be closed, the vacuum pump 4 will be turned off and then the second vacuum regulating valve 6 will be opened for further vacuum distillation.

The safety controller 9 can monitor the temperature and pressure in the distillation kettle 1 at any time. In a case of over-temperature and over-pressure in the system, the safety controller 9 will be started: in a case of over-temperature, the safety controller 9 will sound an alarm, close the heating valve of the distillation kettle 1 and start water cooling; and in a case of over-pressure, the safety controller 9 will also sound an alarm, and turn off the stirring in the distillation kettle 1, start water cooling, and start vacuum relief.

The apparatus and method of the present invention are particularly suitable for the purification and recovery of organic liquids with boiling points in the range of 20° C.-200° C. When the boiling point is higher than 200° C., such as between 200° C. and 300° C., as demonstrated by experiments, the improvement in the overall effect of purification and recovery is not as significant as that when the boiling point is in the range of 20° C.-200° C., however, the apparatus and method of the present invention still has a higher recovery rate than the prior art for purification and recovery.

What is claimed is:

1. A method for purification and recovery of an organic liquid by using an apparatus, wherein the apparatus comprises:
　　a distillation kettle (1), a receiver tank (2) connected to the distillation kettle (1) by a distillation pipe (102), and a vacuum pump (4); a vacuum storage tank (3) is arranged between the receiver tank (2) and the vacuum pump (4); the vacuum storage tank (3) and the receiver tank (2) are connected by a vacuum regulating pipe (203); a first vacuum regulating valve (6) being arranged on the vacuum regulating pipe (203); and the vacuum storage tank (3) and the vacuum pump (4) are connected by an evacuation pipe (304), a second vacuum regulating valve (7) being arranged on the evacuation pipe (304);
　wherein the method comprises:
　　1) feeding the organic liquid to be processed into the distillation kettle (1);
　　2) disabling communication between the vacuum storage tank (3) and the receiver tank (2), turning on the vacuum pump (4) to evacuate the vacuum storage tank (3) to a preset value and then turning off the vacuum pump (4), and disabling communication between the vacuum pump (4) and the vacuum storage tank (3);
　　3) enabling the communication between the vacuum storage tank (3) and the receiver tank (2), the organic liquid being distilled off and collected in the receiver tank (2);
　　4) repeating steps 2) and 3) in turn of an event of insufficient vacuum in the vacuum storage tank (3); and
　　5) repeating step 4) for a plurality of times until there is no more liquid distillate being produced.

2. The method for purification and recovery of an organic liquid as claimed in claim 1, wherein the vacuum storage tank (3) is provided with a condensing device.

3. The method for purification and recovery of an organic liquid as claimed in claim 1, wherein a temperature monitoring device, a pressure monitoring device, the first vacuum regulating valve (6), the second vacuum regulating valve (7) and the vacuum pump (4) are each connected to an intelligent controller (5) through control circuit.

4. The method for purification and recovery of an organic liquid as claimed in claim 1, wherein a cooling device is arranged outside the distillation kettle (1), a cooling water pipe and a steam pipe of the cooling device being each provided with an automatic control valve which is connected to the intelligent controller (5) through control circuit.

5. The method for purification and recovery of an organic liquid as claimed in claim 4, wherein the intelligent controller (5) comprises a vacuum regulating controller (8) and a safety controller (9); the first vacuum regulating valve (6), the second vacuum regulating valve (7), and the pressure monitoring device of the vacuum storage tank (3) are connected to the vacuum regulating controller (8); and the temperature monitoring device and the pressure monitoring device of the distillation kettle (1), the pressure monitoring device of the receiver tank (2), and the automatic control valves of the cooling device are connected to the safety controller (9) through control circuits.

6. The method for purification and recovery of an organic liquid of claim 5, wherein a process of purification and recovery is controlled by the intelligent controller (5), wherein the vacuum regulating controller (8) of the intelligent controller (5) monitors pressure in the vacuum storage tank (3) and controls opening and closing of the first vacuum regulating valve (6) and the second vacuum regulating valve (7) and on and off states of the vacuum pump (4); and the safety controller (9) of the intelligent controller (5) monitors pressure in the receiver tank (2) and pressure and temperature in the distillation kettle (1), and controls on and off states of the cooling device and a stirring device of the distillation kettle (1).

7. A method for purification and recovery of an organic liquid by using an apparatus, wherein the apparatus comprises:
  a distillation kettle (1), a receiver tank (2) connected to the distillation kettle (1) by a distillation pipe (102), and a vacuum pump (4); a vacuum storage tank (3) is arranged between the receiver tank (2) and the vacuum pump (4); the vacuum storage tank (3) and the receiver tank (2) are connected by a vacuum regulating pipe (203); a first vacuum regulating valve (6) being arranged on the vacuum regulating pipe (203); and the vacuum storage tank (3) and the vacuum pump (4) are connected by an evacuation pipe (304), a second vacuum regulating valve (7) being arranged on the evacuation pipe (304);
  wherein the method comprises:
  1) enabling communication between the receiver tank (2) and the vacuum storage tank (3) and communication between the vacuum storage tank (3) and the vacuum pump (4), turning on the vacuum pump (4) to evacuate the system to a preset value and then turning off the vacuum pump (4), and disabling the communication between the vacuum pump (4) and the vacuum storage tank (3);
  2) continuously feeding the organic liquid to be processed into the distillation kettle (1), the organic liquid being distilled off and collected in the receiver tank (2);
  3) in an event of insufficient vacuum in the vacuum storage tank (3), disabling the communication between the vacuum storage tank (3) and the receiver tank (2), enabling the communication between the vacuum storage tank (3) and the vacuum pump (4), and turning on the vacuum pump (4) to evacuate the vacuum storage tank (3) to a preset value and then turning off the vacuum pump (4), and disabling the communication between the vacuum storage tank (3) and the vacuum pump (4), and then enabling the communication between the vacuum storage tank (3) and the receiver tank (2) to continue distillation of the liquid; and
  4) repeating step 3) for a plurality of times until there is no more liquid distillate being produced.

8. The method for purification and recovery of an organic liquid of claim 7, wherein the distillation kettle (1) is preheated to a preset value before step 1); and the liquid to be processed is preheated to a preset value before being fed into the distillation kettle (1) in step 2).

9. The method for purification and recovery of an organic liquid as claimed in claim 7, wherein the vacuum storage tank (3) is provided with a condensing device.

10. The method for purification and recovery of an organic liquid as claimed in claim 7, wherein a temperature monitoring device, a pressure monitoring device, the first vacuum regulating valve (6), the second vacuum regulating valve (7) and the vacuum pump (4) are each connected to an intelligent controller (5) through control circuit.

11. The method for purification and recovery of an organic liquid as claimed in claim 7, wherein a cooling device is arranged outside the distillation kettle (1), a cooling water pipe and a steam pipe of the cooling device being each provided with an automatic control valve which is connected to the intelligent controller (5) through control circuit.

12. The method for purification and recovery of an organic liquid as claimed in claim 11, wherein the intelligent controller (5) comprises a vacuum regulating controller (8) and a safety controller (9); the first vacuum regulating valve (6), the second vacuum regulating valve (7), and the pressure monitoring device of the vacuum storage tank (3) are connected to the vacuum regulating controller (8); and the temperature monitoring device and the pressure monitoring device of the distillation kettle (1), the pressure monitoring device of the receiver tank (2), and the automatic control valves of the cooling device are connected to the safety controller (9) through control circuits.

13. The method for purification and recovery of an organic liquid of claim 12, wherein a process of purification and recovery is controlled by the intelligent controller (5), wherein the vacuum regulating controller (8) of the intelligent controller (5) monitors pressure in the vacuum storage tank (3) and controls opening and closing of the first vacuum regulating valve (6) and the second vacuum regulating valve (7) and on and off states of the vacuum pump (4); and the safety controller (9) of the intelligent controller (5) monitors pressure in the receiver tank (2) and pressure and temperature in the distillation kettle (1), and controls on and off states of the cooling device and a stirring device of the distillation kettle (1).

* * * * *